US 7,283,701 B2

United States Patent
Hallemeier et al.

(10) Patent No.: US 7,283,701 B2
(45) Date of Patent: Oct. 16, 2007

(54) OPTICAL FIBER TRANSMISSION SYSTEM WITH INCREASED EFFECTIVE MODAL BANDWIDTH TRANSMISSION

(75) Inventors: Peter Hallemeier, North Haven, CT (US); Mark Colyar, Fountainville, CT (US); Eitan Gertel, Gwynedd, CT (US); Heider Naim Ereifej, Chalfont, PA (US)

(73) Assignee: Optium Corporation, Chalfont, PA (US)

( * ) Notice: Subject to any disclaimer, the term of this patent is extended or adjusted under 35 U.S.C. 154(b) by 0 days.

(21) Appl. No.: 10/707,729

(22) Filed: Jan. 7, 2004

(65) Prior Publication Data

US 2005/0025417 A1    Feb. 3, 2005

Related U.S. Application Data

(63) Continuation-in-part of application No. 10/605,490, filed on Oct. 2, 2003, now abandoned, and a continuation-in-part of application No. 10/605,107, filed on Sep. 9, 2003.

(60) Provisional application No. 60/481,166, filed on Aug. 1, 2003.

(51) Int. Cl.
  *G02B 6/26*    (2006.01)
  *G02B 6/42*    (2006.01)

(52) U.S. Cl. .......................... 385/28; 385/15; 385/27; 385/31; 385/39

(58) Field of Classification Search .................. 385/28, 385/15, 27, 31, 39
  See application file for complete search history.

(56) References Cited

U.S. PATENT DOCUMENTS

| 5,416,862 A | 5/1995 | Haas et al. ................... 385/28 |
| 6,154,589 A | 11/2000 | Kirk et al. .................... 385/29 |
| 6,185,346 B1 | 2/2001 | Asawa et al. ................. 385/28 |
| 6,356,680 B1 | 3/2002 | Kirk et al. .................... 385/29 |
| 6,360,045 B1 * | 3/2002 | Shoval et al. ............... 385/123 |
| 6,415,076 B1 * | 7/2002 | DeCusatis .................... 385/28 |

(Continued)

OTHER PUBLICATIONS

Haas, A Mode-Filtering Scheme For Improvement Of The Bandwidth-Distance Product In Multimode Fiber Systems, Journal of Lightwave Technology, Jul. 1993, pp. 1125-1131, vol. 11, No. 7, IEEE.

(Continued)

*Primary Examiner*—Frank G. Font
*Assistant Examiner*—Jerry Martin Blevins
(74) *Attorney, Agent, or Firm*—Kurk Rauschenbach; Rauschenbach Patent Law Group, LLC

(57) ABSTRACT

A multi-mode optical fiber link is described that includes a single-mode optical fiber having an input that receives an optical signal for transmission through the multi-mode optical fiber link. A first spatial mode converter is coupled to the single-mode optical fiber. The first spatial mode converter conditions a modal profile of the optical signal for propagation through a multi-mode optical fiber. A multi-mode optical fiber is coupled to an output of the first spatial mode converter. A second spatial mode converter is coupled to an output of the multi-mode optical fiber. The second spatial mode converter reduces a number of optical modes in the optical signal. Both the first and the second spatial mode converters increase an effective modal bandwidth of the optical signal propagating through an output of the second spatial mode converter.

44 Claims, 8 Drawing Sheets

U.S. PATENT DOCUMENTS

| | | |
|---|---|---|
| 6,487,338 B2 | 11/2002 | Asawa et al. ................. 385/29 |
| 6,510,265 B1 | 1/2003 | Giaretta et al. ............... 385/38 |
| 6,609,834 B2* | 8/2003 | Cunningham et al. ........ 385/60 |
| 2002/0097941 A1* | 7/2002 | Forrest et al. ................. 385/1 |
| 2002/0118934 A1* | 8/2002 | Danziger et al. ........... 385/122 |
| 2002/0126954 A1 | 9/2002 | Asawa et al. ................. 385/28 |
| 2002/0191906 A1 | 12/2002 | Price et al. ................... 385/24 |
| 2003/0011847 A1 | 1/2003 | Dai et al. .................... 359/161 |
| 2003/0118263 A1* | 6/2003 | Phua et al. .................... 385/11 |

OTHER PUBLICATIONS

Gandhi, et al., Electronic Dispersion Compensation, Santel Networks, Inc., 2002.

Donlagic, et al., Propagation Of The Fundamental Mode In Curved Graded Index Multimode Fiber And Its Application In Sensor Systems, Journal of Lightwave Technology, Mar. 2000, pp. 334-342, vol. 18, No. 3, IEEE.

Brown, Bandwidth And Rise Time Calculations For Digital Multimode Fiber-Optic Data Links, Journal of Lightwave Technology, May 1992, pp. 672-678, vol. 10, No. 5, IEEE.

Donlagic et al., Microbend Sensor Structure For Use In Distributed And Quasi-Distributed Sensor Systems Based On Selective Launching And Filtering Of The Modes In Graded Index Multimode Fiber, Journal of Lightwave Technology, Oct. 1999, pp. 1856-1868, vol. 17, No.

* cited by examiner

OPTICAL FIBER TRANSMISSION SYSTEM WITH INCREASED EFFECTIVE MODAL BANDWIDTH TRANSMISSION

CROSS REFERENCE TO RELATED APPLICATIONS

This patent application is a continuation-in-part of U.S. patent application Ser. No. 10/605,490, filed on Oct. 2, 2003 now abandoned, entitled "Optical Fiber Transmission system with Increased Effective Modal Bandwidth Transmission," which is a continuation-in-part of U.S. patent application Ser. No. 10/605,107, filed on Sep. 9, 2003, entitled "Optical Transmitter for Increased Effective Modal Bandwidth Transmission," which claims priority to U.S. provisional patent application No. 60/481,166, filed on Aug. 1, 2003, entitled "Optical Fiber Transmission System with Increased Effective Modal Bandwidth." The entire disclosure of U.S. patent application Ser. No. 10/605,490, U.S. patent application Ser. No. 10/605,107 and U.S. provisional patent application number 60/481,166 are incorporated herein by reference.

BACKGROUND OF INVENTION

Many existing optical fiber transmission systems use multi-mode optical fiber. Multi-mode optical fiber is widely used because it is relatively inexpensive, easy to install and because it is suitable for use with low cost transmitter and receiver components. The relatively large optical fiber core and numerical aperture of multi-mode optical fibers allows more light to be launched into the optical fiber, as compared to single-mode optical fibers. Therefore, such systems can use lower power and lower cost optical sources. For these reasons, local area networks have employed multi-mode optical fiber for many years. Some data communication systems, such as Fiber Data Distribution Interface (FDDI) systems are specifically designed to use multi-mode optical fiber. Known multimode optical fiber transmission systems, however, have relatively low bandwidth-distance products for a given bit error rate (BER) and, therefore, are not suitable for many state-of-the art communication systems.

BRIEF DESCRIPTION OF DRAWINGS

This invention is described with particularity in the detailed description and the claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention relates to methods and apparatus for reducing modal noise generation and increasing the effective modal bandwidth of optical fiber transmission systems. The term "modal noise" is described herein to mean the noise penalty at the receiver that is caused by time-varying modal losses in the detected optical signal.

Modal noise is generated when optical modes of the optical signal propagate through regions in an optical fiber that create mode selective losses (MSL). The term "mode selective loss (MSL)" is defined herein as a loss in a multimode fiber optic cable that results in a non-uniform loss to the modes traveling in the optical fiber. Mode selective losses can be caused by geometrical discontinuities in the optical path, such as geometrical discontinuities caused by physical bends in the optical fiber, fiber defects, and contamination proximate to the optical fiber connector. Mode selective losses can also occur in spatial mode converters or optical filters.

Modal noise is also generated when the individual optical modes of the optical signal are exposed to certain environmental conditions, such as thermal or mechanical excitation, during propagation. In addition, modal noise is generated when spectral (wavelength) perturbations occur that change the optical path lengths.

The term "effective modal bandwidth" is defined herein to mean the bandwidth-distance product of the transmission system for a given Bit Error Rate (BER) and/or a certain transmission specification. Increasing the effective modal bandwidth of a multi-mode optical fiber transmission system will allow bandwidth providers to increase the data rate and will extend the useful service life of many installed multi-mode optical fiber transmission systems.

One aspect of the present invention is embodied in the design of optical transmitters that have reduced modal noise generation and increase the effective modal bandwidth of optical fiber transmission systems. Such optical transmitters have improved or optimum spectral and phase characteristics and reduced unwanted spectral dynamics for efficient transmission of data in a multi-mode optical fiber. In one embodiment of this aspect of the present invention, the transmitter includes an electro-absorption modulated laser (EML) that is designed to operate without external cooling.

Another aspect of the present invention is embodied in the use of spatial filtering to reduce the number of modes propagating in a multi-mode optical fiber. Reducing the number of modes reduces the effects of modal variation and mixing. These aspects alone or in combination increase the effective modal bandwidth of multi-mode optical fiber transmission systems.

Figure 1:
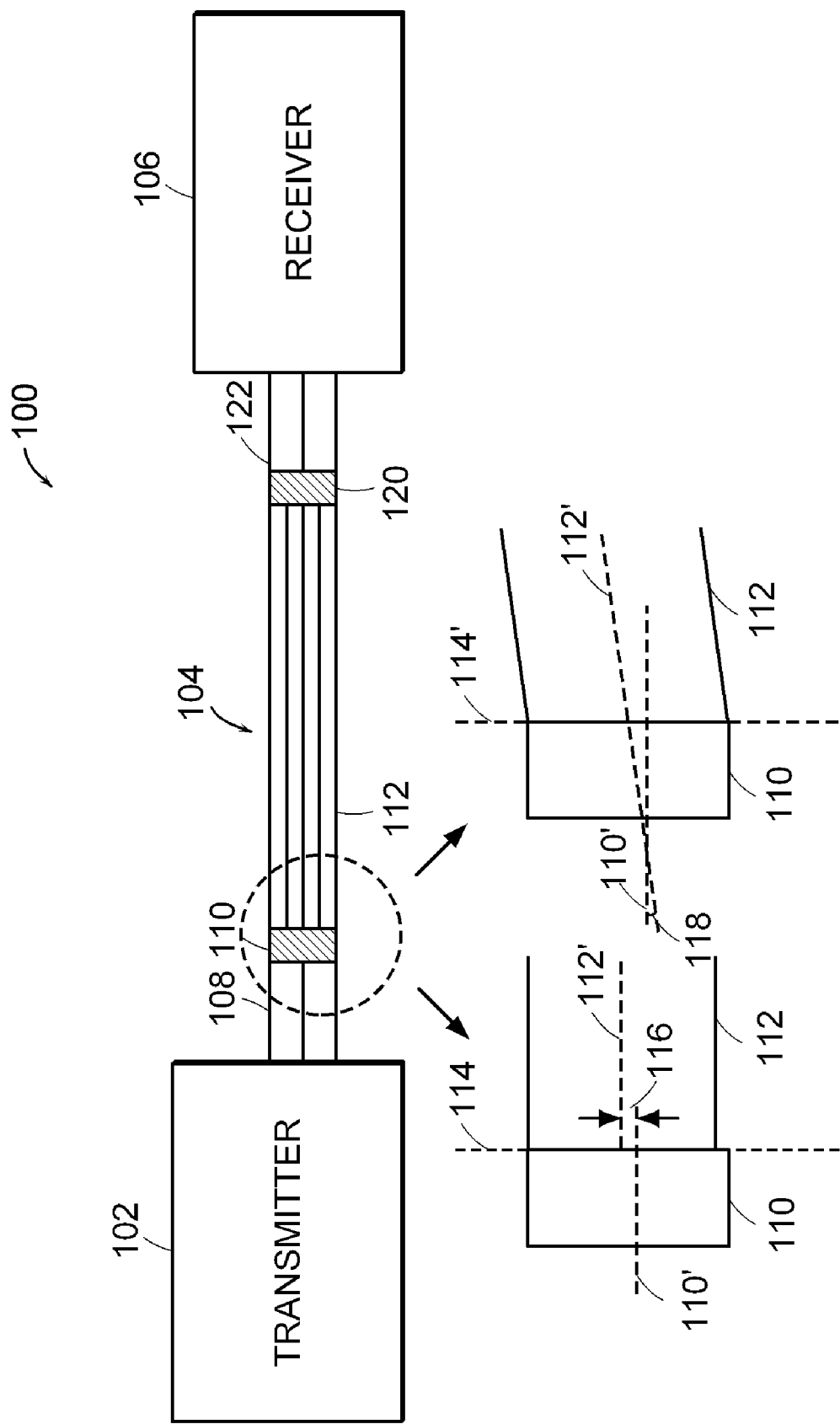
FIG. 1 illustrates a block diagram of a multi-mode optical fiber transmission system that includes two spatial mode optical converters according to the present invention.

FIG. 1 illustrates a block diagram of a multi-mode optical fiber transmission system 100 that includes two spatial mode optical converters according to the present invention. The transmission system 100 includes an optical transmitter 102, a multi-mode optical fiber link 104, and an optical receiver 106. The optical transmitter 102 generates optical signals for data transmission through the multi-mode optical fiber link 104.

In one embodiment, the optical transmitter 102 includes an intensity modulated optical source, an electro-absorption modulated laser (EML), an integrated laser modulator, or a laser modulator having parameters that generate optical signals with improved or optimal spectral and phase characteristics for transmission through a multi-mode optical fiber link. In one embodiment, the optical transmitter 102 includes an EML designed to operate without external cooling and to generate an optical signal with relatively low spectral and phase information for efficient transmission through a multi-mode optical fiber.

In one embodiment, the optical transmitter 102 includes more than one optical source that generates additional optical signals at the same or different wavelengths in order to increase the data capacity of the multi-mode optical fiber link 104. In some embodiments, the optical source includes a WDM optical source that generates a plurality of optical signals where each of the plurality of optical signals has a different wavelength on the ITU grid.

In some embodiments, the multi-mode optical fiber transmission system 100 includes additional optical transmitters 102 that are used to generate optical signals that propagate in opposite directions in the same multi-mode optical fiber. In these embodiments, separate optical carriers can be used to minimize cross-talk between optical signals propagating in opposite directions.

The optical transmitter 102 is optically coupled to a single-mode optical fiber 108. Optical signals generated by the optical transmitter 102 propagate through the single-mode optical fiber 108. The multi-mode optical fiber link 104 includes a first spatial mode converter 110 that is optically coupled to the single-mode optical fiber 108. The first spatial mode converter 110 conditions the modal profile of the optical signal.

The first spatial mode converter 110 can condition the modal profile in many ways in order to increase the effective bandwidth of the optical signal or to increase other performance metrics of the multi-mode fiber optic transmission system 100. For example, the first spatial mode converter 110 can condition the modal profile of the optical signal to reduce phase and sideband information, modal noise, or modal dispersion in the optical signal.

The multi-mode optical fiber link 104 includes a multi-mode optical fiber section 112 that is optically coupled to the first spatial mode converter 110. The multi-mode optical fiber section 112 can include a single length of multi-mode optical fiber or can include multiple lengths of multi-mode optical fiber that are coupled together. The multiple lengths of multi-mode optical fiber can be butt-coupled together. For example, the butt couplings between multiple lengths of multi-mode optical fiber can be tapered optical fiber sections or can be polished optical fiber sections.

In one embodiment, the multi-mode optical fiber section 112 includes at least one single mode optical fiber link section. The single-mode optical fiber link section can be a long-haul optical fiber link section that connects distant networks. In this embodiment, the multi-mode optical fiber transmission system 100 can be used to link multiple enterprise networks that are separated by long distances.

In one embodiment, the first spatial mode converter 110 comprises a modal conditioning patch that conditions the optical signal propagating from the single-mode optical fiber 108 to a multi-mode optical signal for transmission through the multi-mode optical fiber section 112. Modal conditioning patches are known in the art. For example, U.S. Pat. No. 6,415,076B1, issued Jul. 2, 2002, entitled "Mode Conditioning Patch for Facilitating Signal Transmission from Single Mode optical Fiber to Multimode Optical Fiber," describes a modal conditioning patch that is suitable for use in an optical transmission system according to the present invention. In this embodiment, the modal conditioning patch can include a transition region having a diameter that increases to approximately equal the diameter of the multi-mode optical fiber section 112. The transition section can be a flared end of the single-mode optical fiber 108 that is fusion spliced to the multi-mode optical fiber section 112.

In one embodiment of the invention, the multi-mode optical fiber section 112 is optically coupled to the first spatial mode converter 110 at an interface 114 that creates an offset launch condition. The term "offset launch condition" is defined herein to mean a condition where the optical signal is launched into the multi-mode optical fiber section 112 in a manner that causes the center of the optical signal's modal profile to propagate in a path that is displaced from the geometric center optical axis 112' of the multi-mode optical fiber section 112. The term "center of the optical signal's modal profile" is defined herein to mean the portion of the modal profile that corresponds to the peak optical intensity. Certain offset launch conditions can excite higher-order modes in an optical signal propagating in the multi-mode optical fiber section 112. In addition, certain offset launch conditions can improve coupling efficiency by increasing real-index anti-guiding.

One method of creating an offset launch condition is to couple the multi-mode optical fiber section 112 to the first spatial mode converter 110 at the interface 114 in a manner where the geometric center optical axis 110' of the first spatial mode converter 110 is offset a predetermine distance 116 from the geometric center optical axis 112' of the multi-mode optical fiber section 112. This method launches the optical signal propagating from the first spatial mode converter 110 into the multi-mode optical fiber section 112 at a physical position where the center of the optical signal's modal profile, which corresponds to the peak optical intensity distribution, is not aligned with the geometric center optical axis 112' of the multi-mode optical fiber link section 112. This method can also launch the optical signal propagating from the first spatial mode converter 110 into the multi-mode optical fiber section 112 at a physical position where the center of the optical signal's modal profile, which corresponds to the peak optical intensity distribution, is not aligned with the peak optical intensity in the multi-mode optical fiber section 112.

The desired predetermined distance 116 of the offset depends on the optical properties of the first spatial mode converter 110, the optical properties of the multi-mode optical fiber section 112, and the modal profile of the optical signal. For example, in some embodiments, the predetermined distance 116 of the offset is between about fifteen and twenty-five micrometers.

Another method of creating an offset launch condition is to couple the input of the multi-mode optical fiber section 112 to the first spatial mode converter 110 at the interface 114' in a manner where the optical signal is launched from the first spatial mode converter 110 into the multi-mode optical fiber section 112 at a predetermined non-zero angle 118 relative to a geometrical center optical axis 112' of the multi-mode optical fiber section 112. This method can be achieved by coupling the multi-mode optical fiber section 112 to the first spatial mode converter 110 at the interface 114' so as to achieve a predetermined non-zero angle between the geometrical center optical axis 110' of the first spatial mode converter 110 and the geometrical center optical axis 112' of the multi-mode optical fiber section 112.

A second spatial mode converter 120 is optically coupled to an output of the multi-mode optical fiber section 112. The second spatial mode converter 120 reduces the number of modes in the optical signal and, therefore, limits the number of dominant modes in the optical signal that are received by the optical receiver 106. The second spatial mode converter 120 can reduce the number of higher-order modes, the number of lower-order modes or both the number of higher and lower-order modes in the optical signal. The term "lower-order modes" is defined herein to mean modes in which most of the energy is localized around the center of the optical fiber core of the multi-mode optical fiber section 112. The term "higher-order modes" is defined herein to mean modes in which most of the energy is localized outside of the center of the optical fiber core of the multi-mode optical fiber section 112.

The second spatial mode converter 120 is optically coupled to the input of the receiver 106. In one embodiment the input of the receiver 106 is directly coupled to the second spatial mode converter 120. For example, in this embodiment, the receiver can include a detector that is butt-coupled directly to the second spatial mode converter 120. In another embodiment, the receiver 106 is coupled to the second spatial mode converter 120 by a second single mode optical fiber 122.

Both the first and the second spatial mode converters 110, 120 increase the effective modal bandwidth of the multi-mode optical fiber transmission system 100. The first spatial mode converter 110 can be any type of spatial mode converter that conditions the modal profile. The second spatial mode converter 120 can be any type of spatial mode converter that reduces the number of modes in the optical signal generated by the optical transmitter 102.

The first and second spatial mode converters 110, 120 can be embodied in many different types of devices. For example, the first and second spatial mode converters 110, 120 can include a fusion splice or a butt coupling to the multi-mode optical fiber section 112. In some embodiments, the butt coupling is positioned at a bulkhead. The first and second spatial mode converters 110, 120 can also include a pin hole aperture. In some embodiments, the pin hole aperture has a diameter that is between about twelve to twenty-five micrometers. In other embodiments, the pin hole aperture includes at least two concentric circular apertures. The first and second spatial mode converters 110, 120 can also include an optical filter. In addition, the first and second spatial mode converters 110, 120 can include a lens imaging system having refractive and diffractive elements.

The effective modal bandwidth of the multi-mode optical fiber transmission system 100 according to the present invention including the first and the second spatial mode converters 110, 120 has a relatively high-level of immunity to polarization effects, fiber stress, vibration, and changes in temperature. In particular, there is little or no change in the effective modal bandwidth due to changes in laser polarization or changes in polarization caused by mechanical stress on the multi-mode optical fiber link 104. Also, there is little or no change in the effective modal bandwidth due to temperature changes in the fiber environment.

In one embodiment, the receiver 106 includes electronic dispersion compensation. In this embodiment, the receiver 106 includes at least one active electrical filter that is electrically coupled to the output of a detector as described herein. Also, in one embodiment, the receiver 106 includes dynamic re-optimization that automatically adjusts at least one receiver parameter in order to compensate for changes in an average power of the received optical signal as described herein.

The present invention features a method of increasing effective modal bandwidth of an optical signal transmitted through a multi-mode optical fiber. The method includes generating an optical signal. In one embodiment, the optical signal is generated with relatively low phase and/or sideband information. The optical signal is then spatially mode converted to an optical signal having a conditioned modal profile. The spatial mode converting reduces modal dispersion, which increases an effective bandwidth of the optical signal.

The optical signal having the conditioned modal profile is then propagated through a multi-mode optical fiber. The optical signal propagating through the multi-mode optical fiber is then spatially mode converted, which further increases the effective bandwidth of the optical signal. The spatial mode conversions can reduce changes in effective modal bandwidth of the optical signal that are caused by physical effects, such as thermal variations in the multi-mode optical fiber section 112, polarization effects in the multi-mode optical fiber section 112, mechanical stress in the multi-mode optical fiber link 104, optical fiber splices in the multi-mode optical fiber link 104, and optical connector misalignment in the multi-mode optical fiber link 104.

The present invention also features a method of increasing the effective modal bandwidth of an optical signal transmitting through a multi-mode optical fiber by using an offset launch condition. The method includes spatial mode converting an optical signal to reduce modal dispersion and increase an effective bandwidth of the optical signal. The spatially mode converted optical signal is launched into a multi-mode optical fiber at an angle and a displacement relative to a geometrical center optical axis of the multi-mode optical fiber. The angle and the displacement are chosen to excite higher-order modes in optical signals propagating in the multi-mode optical fiber. In one embodiment, at least one of the angle and the displacement is equal to zero.

The spatially mode converted optical signal is then propagated through a multi-mode optical fiber. The spatially mode converted optical signal propagated through the multi-mode optical fiber is then spatially mode converted to further reduce modal dispersion and to further increase the effective bandwidth of the optical signal. In one embodiment, the spatial mode converting the spatially mode converted optical signal propagated through the multimode optical fiber includes aperturing or spatially blocking the spatially mode converted optical signal to reduce the number of modes propagating in the optical signal.

The spatially mode converting both the optical signal and the spatially mode converted optical signal can reduce changes in effective modal bandwidth of the optical signal that are caused by several effects, such as thermal variations in the multi-mode optical fiber, polarization effects in the multi-mode optical fiber, and mechanical stress in the multi-mode optical fiber.

Some aspects of the present invention are described in connection with a multi-mode optical fiber link that is typically a local area fiber link or an enterprise optical fiber link. However, the present invention can also be practiced with a single-mode optical fiber link that is typically a long-haul optical fiber link.

Figure 2:
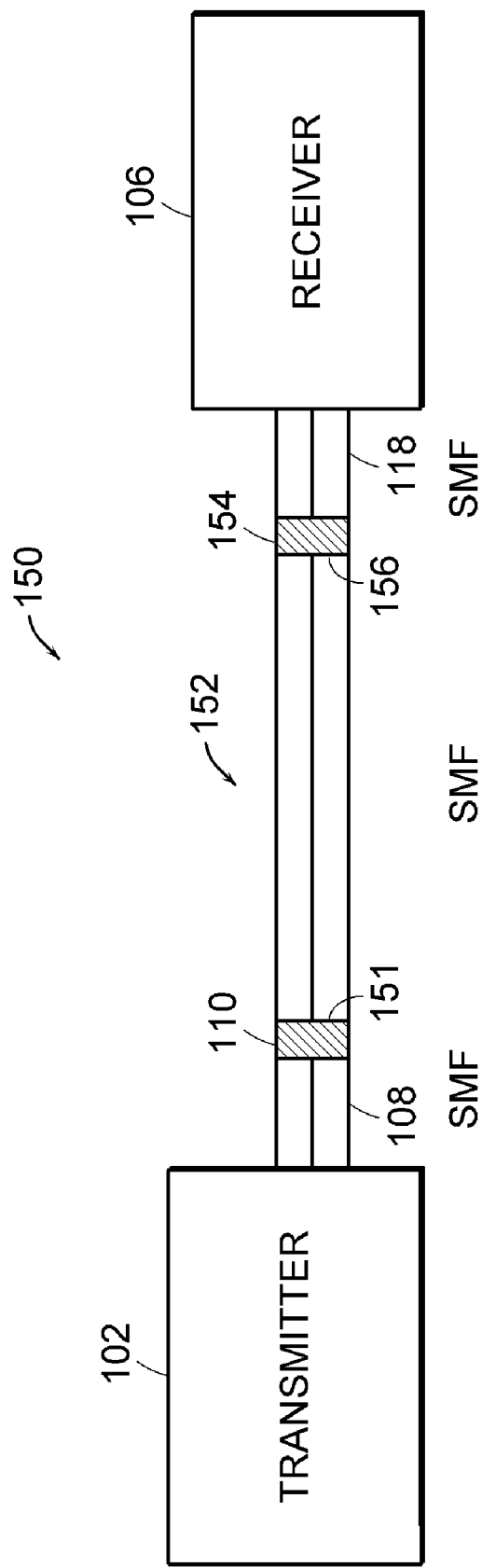
FIG. 2 illustrates a block diagram of a single-mode optical fiber transmission system that includes a spatial mode optical converter according to the present invention.

FIG. 2 illustrates a block diagram of a single-mode optical fiber transmission system 150 that includes a spatial mode optical filter according to the present invention. The transmission system 150 includes an optical transmitter 102, a single-mode optical fiber link 152, and an optical receiver 106. The single-mode optical fiber transmission system 150 is similar to the multi-mode optical fiber transmission system 100 that was described in connection with FIG. 1.

The optical transmitter 102 generates optical signals for data transmission through the single-mode optical fiber link 152. In one embodiment, the optical transmitter 102 includes more than one optical source that generates additional optical signals at different wavelengths that increase the data capacity of the single-mode optical fiber link 152. In some embodiments, the single-mode optical fiber transmission system 100 includes additional optical transmitters 102 that are used to generate optical signals that propagate in opposite directions in the same single-mode optical fiber.

The optical transmitter 102 is optically coupled to a single-mode optical fiber 108. Optical signals generated by the optical transmitter 102 propagate down the single-mode optical fiber 108. A first spatial mode converter 110 is optically coupled to the single-mode optical fiber 108. The first spatial mode converter 110 conditions the modal profile in the optical signal propagating through the first spatial mode converter 110.

An input 151 of the single-mode optical fiber link 152 is optically coupled to the first spatial mode converter 110. The single-mode optical fiber link 152 can include a single length of single-mode optical fiber or can include multiple lengths of single-mode optical fiber that are fusion spliced or coupled together. An optical coupler 154 is optically coupled to an output 156 of the single-mode optical fiber link 152. The optical coupler 154 is also optically coupled to a second single-mode optical fiber 122.

The first spatial mode converter 110 increases the effective modal bandwidth of the single-mode optical fiber transmission system 150. The effective modal bandwidth of the single-mode optical fiber transmission system 150 according to the present invention including the first spatial mode converter 110 has a relatively high-level of immunity to polarization effects, fiber stress, and changes in temperature.

In one embodiment, the receiver 106 includes an electronic dispersion compensation circuit. In this embodiment, the receiver 106 includes at least one active electrical filter that is electrically coupled to the output of a detector as described herein. Also, in one embodiment, the receiver includes dynamic re-optimization that automatically adjusts at least one receiver parameter in order to compensate for changes in an average power of the received optical signal as described herein.

Figure 3A:
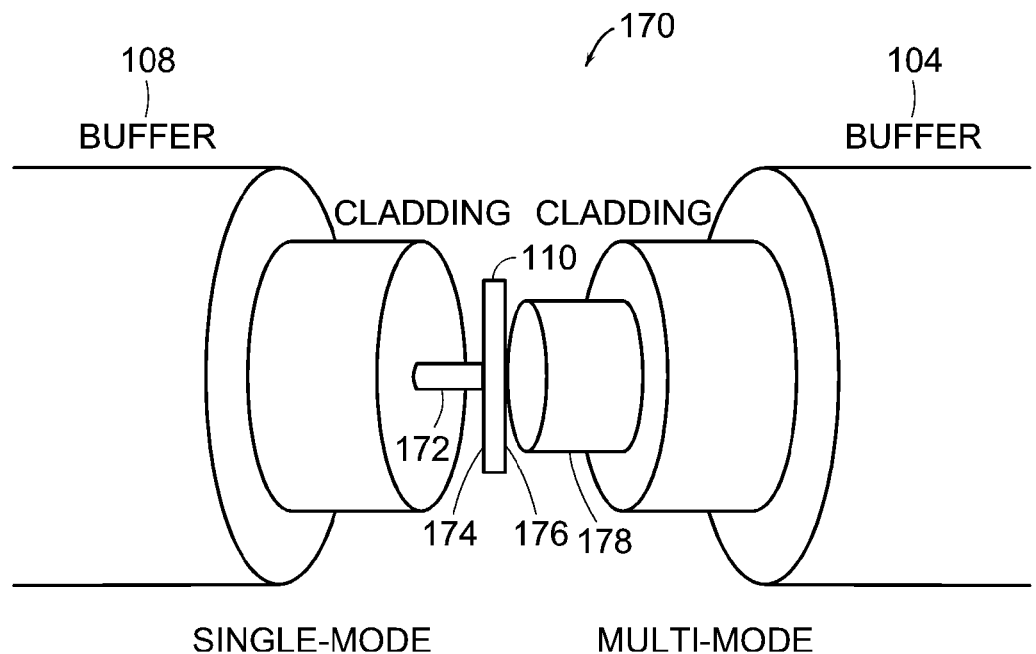
FIG. 3A is a schematic representation of the first spatial mode converter that couples the single mode optical fiber and the multi-mode optical fiber according to the present invention.

FIG. 3A is a schematic representation 170 of the first spatial mode optical converter 110 that couples the single mode optical fiber 108 and the multi-mode optical fiber link 104 according to the present invention. The single mode optical fiber 108 is designed to propagate an optical signal having a wavelength with only one type of spatial distribution (i.e. one optical mode). Single-mode optical fibers typically have a core 172 that is between about 8-10 microns in diameter.

The single mode optical fiber 108 is coupled to an input 174 of the first spatial mode converter 110. The first spatial mode converter 110 can be any type of spatial mode converter that conditions the modal profile of the optical signal that is applied to the input 174. For example, the first spatial mode converter 110 can include a fusion splice, a butt coupling, or a lens imaging system having refractive and diffractive elements. An output 176 of the spatial mode converter 110 is coupled to the multi-mode optical fiber link 104. The multi-mode optical fiber link 104 is designed to support multiple spatial distributions. Multi-mode optical fibers typically have a core 178 that is on the order of 50 microns in diameter.

In one embodiment, the first spatial mode converter 110 couples the single mode optical fiber 108 and the multi-mode optical fiber link 104 so as to achieve a predetermined offset between a center of the core 172 of the first single mode optical fiber 108 and a center of a core 178 of the multi-mode optical fiber in the multi-mode optical fiber link 104. For example, in this embodiment, the center of the core 172 of the first single mode optical fiber 108 can be offset between about 15-25 micrometers from the center of the core 178 of the multi-mode optical fiber in the multi-mode optical fiber link 104. Offsetting the center of the core 172 of the first single mode optical fiber 108 from the center of the core 178 of the multi-mode optical fiber in the multi-mode optical fiber link 104 changes the launch conditions.

Figure 3B:
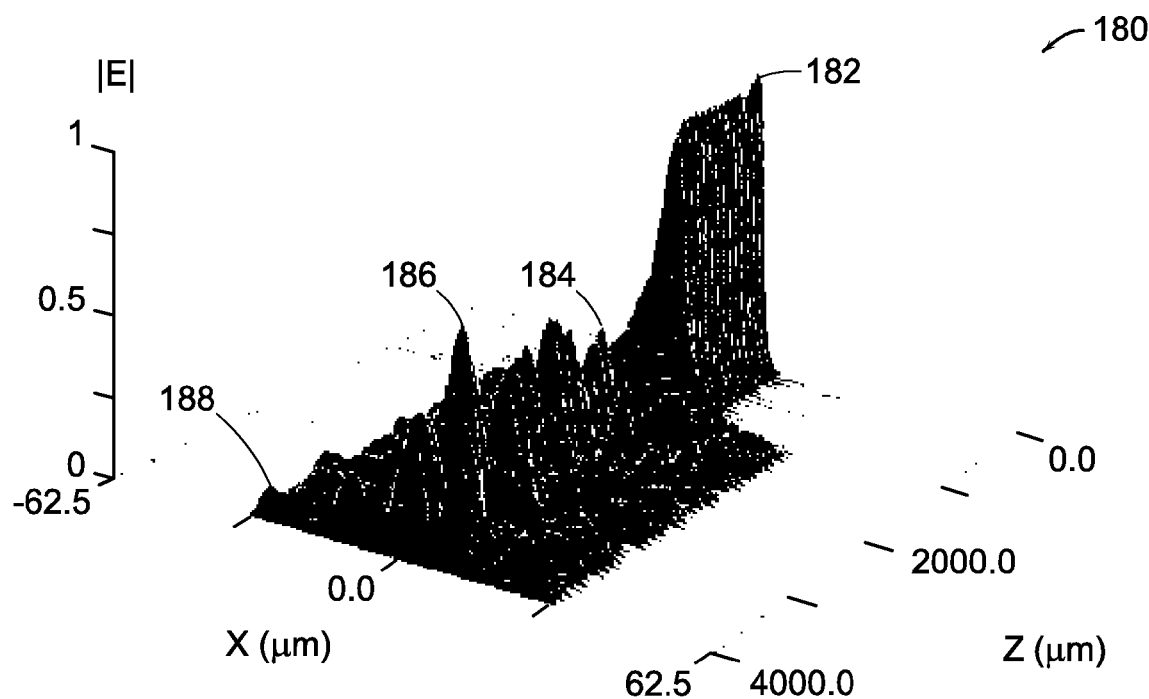
FIG. 3B illustrates an electric field diagram of an optical signal passing from the single mode optical fiber to the multi-mode optical fiber according to the present invention.

FIG. 3B illustrates an electric field diagram 180 of an optical signal passing from the single mode optical fiber 108 to the multi-mode optical fiber link 104 (FIG. 1) according to the present invention. The electric field diagram 180 illustrates the magnitude of the electric field in the optical signal as a function of distance in microns from inside the single mode optical fiber 108 to inside the multi-mode optical fiber link 104.

The magnitude of the electric field intensity 182 in the optical signal at Z=0 micrometers corresponds to the magnitude of the electric field intensity inside the single mode optical fiber 108 and at the input 174 of the spatial mode converter 110. The magnitude of the electric field intensity 184 in the optical signal at Z=1,000 micrometers corresponds to the magnitude of the electric field intensity at the mode conversion point inside the spatial mode converter 110. The magnitude of the electric field intensity 186 in the optical signal at Z=2,000 micrometers corresponds to the magnitude of the electric field intensity at the output 176 of the spatial mode converter 110. The magnitude of the electric field intensity 188 in the optical signal at Z=4,000 micrometers corresponds to the magnitude of the electric field intensity inside of the multi-mode optical fiber link 104.

The electric field diagram of an optical signal passing from the multi-mode optical fiber link 104 to the second single-mode optical fiber 122 (FIG. 1) is similar to the electric field diagram 180 of FIG. 3B, but the distance scale is inverted. The spatial mode converters 110, 120 condition and reduce the number of dominant modes that are received by the optical receiver 106.

Figure 4:
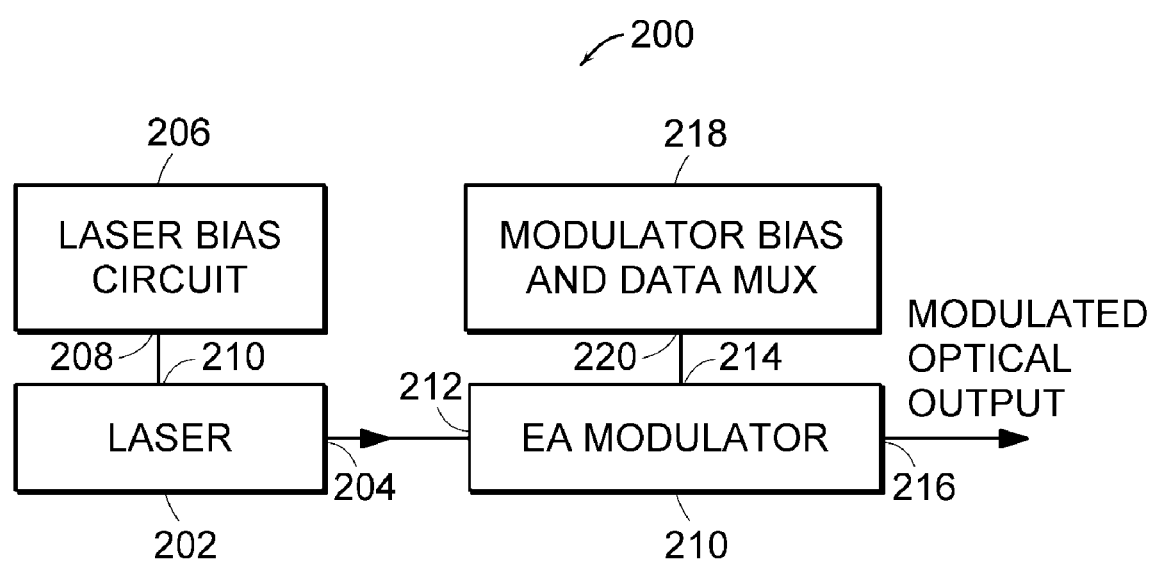
FIG. 4 illustrates a block diagram of an optical transmitter that includes an electro-absorption modulator according to the present invention that generates optical signals with improved or optimal spectral and phase characteristics for transmission through an optical fiber link.

FIG. 4 illustrates a block diagram of an optical transmitter 200 that includes an electro-absorption modulator according to the present invention that generates optical signals with improved or optimal spectral and phase characteristics for transmission through an optical fiber link. The optical transmitter 200 improves the spectral and phase characteristics for transmission through multi-mode optical fiber links, such as the multi-mode optical fiber link 104 that is described in connection with FIG. 1. In addition, the optical transmitter 200 improves the spectral and phase characteristics for transmission through single-mode optical fiber links, such as long-haul single-mode optical fiber links.

The optical transmitter 200 is designed to generate optical signals that have specific characteristics which increase or maximize immunity to variations in the phase of the optical signal received by the optical receiver 106 (FIGS. 1 and 2). One characteristic of the optical signal generated by the optical transmitter 200 is a reduction in time varying phase or sideband information in the transmission spectrum of the optical signal. Another characteristic of the optical signal generated by the optical transmitter 200 is a reduction in the phase information that is required to transmit the data in the optical fiber links 104, 152 (FIGS. 1 and 2).

Another characteristic of the optical signal generated by the optical transmitter 200 is a reduction or elimination of mixing that is required at the optical receiver 106 (FIG. 1) to recover the optical signal. Yet another characteristic of the optical signal generated by the optical transmitter 200 is an increase in isolation of optical signals reflected back towards the optical transmitter 102. In one embodiment of the invention, the optical transmitter 200 generates an optical signal with one or any combination of these characteristics. Generating an optical signal with one or more of these characteristics will increase the effective modal bandwidth of the multi-mode optical fiber transmission system 100 (FIG. 1) and the effective modal bandwidth of the single-mode optical fiber transmission system 150 (FIG. 2).

One type of optical transmitter that can generate an optical signal with one or any combination of these characteristics is an electro-absorptively (EA) modulated optical transmitter. The optical transmitter 200 illustrated in FIG. 4 is an exemplary EA optical modulated transmitter. Numerous types of EA modulated sources can be used in an optical transmitter according to the present invention. In other embodiments, other types of intensity modulators are used.

The optical transmitter 200 includes a laser 202 that generates a continuous wave (CW) optical signal at an output 204. In some embodiments, the laser 202 is a semiconductor diode laser. However, other types of lasers can also be used. The transmitter 200 also includes a laser bias circuit 206. An output 208 of the laser bias circuit 206 is electrically connected to a bias input 210 of the laser 202. The laser bias circuit 206 generates a current at the output 208 that biases the laser 202.

The optical transmitter 200 also includes an Electro-Absorption Modulator (EAM) 210 that modulates the CW optical signal generated by the laser 202. In some embodiments, the laser 202 and the EAM 210 are separate discrete components. In other embodiments, the laser 202 and the EAM 210 are physically integrated on a single substrate. The EAM 210 includes an optical input 212, a bias and modulation input 214, and an optical output 216. The optical input 212 is positioned in optical communication with the output 204 of the laser 202. A waveguide, such as an optical fiber, can be used to optically couple the output 204 of the laser 202 to the optical input 212 of the EAM 210.

The optical transmitter 200 including the EAM 210 generates optical signals with improved or optimal spectral and phase characteristics for transmission through a multi-mode optical fiber link. The modulated optical signal that is generated by the optical transmitter 200 including the EAM 210 has very little phase information because EA modulators operate as efficient intensity modulators.

In one embodiment of the invention, the EAM 210 is specifically designed and fabricated to have at least one parameter that causes the EAM 210 to modulate intensity so as to suppress time varying phase and sideband information in the transmission spectrum. EA modulators are relatively efficient intensity modulators. Therefore, time varying phase and sideband information in the transmission spectrum is generally suppressed. However, a transmitter according to one embodiment of the invention can be designed, fabricated, and/or operated to further reduce time varying phase and sideband information in the transmission spectrum.

There are numerous physical EA modulator parameters that can be adjusted to change the amplitude and phase characteristics of the modulated optical signal in order to suppress phase and sideband information from the transmission spectrum. For example, parameters, such as the extinction ratio or voltage swing of the EA modulator, polarization properties, the 3-dB bandwidth, the facet coating properties, the input third-order intercept (IIP3), and the spurious free dynamic range (SFDR) can be adjusted during design and fabrication to suppress phase and sideband information from the transmission spectrum. Adjusting the extinction ratio of the EA modulator has been shown to suppress phase and sideband information from the transmission spectrum and, consequently, to increase the signal-to-noise ratio of optical signals propagating through multi-mode optical fiber. In one embodiment of the invention, the extinction ratio of the EA modulator 210 is in the range of about five to fifteen.

The optimal value of the extinction ratio is a function of the length of the multi-mode optical fiber. The optimal value of the extinction ratio can also be a function of the number of the fiber connectors and the alignment of the fiber connectors in the multi-mode optical fiber link 104 (FIG. 1) and the single mode optical fiber link 152 (FIG. 2). In addition, the optimal value of the extinction ratio can also be a function and many environmental factors, such as the level of the vibration, mechanical strain, thermal shock, and optical power fluctuations in the optical fiber link.

In one example, an EA modulator with an extinction ratio of about 11.5 has been shown to transmit optical signals through a 1250 foot multi-mode optical fiber link with relatively low phase and sideband information and relatively high signal-to-noise ratio compared with EA modulators having extinction ratios of about five and about eight in the same optical fiber link under similar environmental conditions. In another example, an EA modulator with an extinction ratio of about ten has been shown to transmit optical signals through a 4500 foot multi-mode optical fiber link with relatively low phase and sideband information and relatively high signal-to-noise ratio compared with an EA modulator having an extinction ratio of about five in the same optical fiber link under similar environmental conditions.

The optical transmitter 200 also includes a bias and data multiplexing circuit 218 that generates the desired electrical bias and data signals for the EAM 210. In some embodiments, the bias and data multiplexing circuit 218 includes two physically separate components. In other embodiments, the bias and data multiplexing circuit 218 is one component as shown in FIG. 4. An output 220 of the bias and data multiplexing circuit 218 is electrically connected to the modulation input 214 of the EAM 210. The EAM 210 modulates the CW optical signal generated by the laser 202 with an electronic data signal generated by the bias and data multiplexing circuit 218. The modulated optical signal propagates from the optical output 216 of the EAM 210.

In one embodiment of the invention, the operating conditions of the EAM 210 are chosen so as to suppress phase and/or sideband information in the transmission spectrum generated by the EAM 210. For example, the operating temperature of the EAM 210 and the bias voltage that is generated by the bias and data multiplexing circuit 218 and applied to the modulation input 214 of the EAM 210 can be adjusted during operation to suppress phase and/or sideband information from the optical signal.

In addition, parameters of the laser 202 that generates the optical signal which is modulated by the EAM 210 can be adjusted to suppress phase and/or sideband information from the transmission spectrum. For example, parameters, such as the wavelength and the optical mode structure of the optical signal generated by the laser 202 can be adjusted so as to suppress phase information and/or sideband information from the modulated optical signal.

The modulated optical signal that is generated by the optical transmitter 200 including the EAM 210 has certain characteristics in its transmission spectrum that increase the effective modal bandwidth of the optical fiber link. For example, one characteristic of the transmission spectrum is that the optical signal has minimal time varying phase. Another characteristic of the transmission spectrum is that it has minimal sideband information.

The modulated optical signal that is generated by the optical transmitter 200 requires essentially no phase information to transmit the data in an optical link, such as the multi-mode optical fiber link 104 (FIG. 1) and the single-mode optical fiber link 152 (FIG. 2). In addition, the modulated optical signal that is generated by the optical transmitter 200 has good isolation from optical signals reflecting back towards the optical transmitter 200.

Thus, the optical transmitter 200 improves the spectral and phase characteristics for transmission through multi-mode optical fiber links, such as the multi-mode optical fiber link 104 that is described in connection with FIG. 1. In addition, the optical transmitter 200 improves the spectral and phase characteristics for transmission through single-mode optical fiber links, such as the single-mode optical fiber link 152 that is described in connection with FIG. 2.

There are numerous other types of optical transmitters that when designed, fabricated, and operated according to the present invention will generate optical signals with improved or optimal spectral and phase characteristics for transmission through a multi-mode and single-mode optical fiber link. These optical transmitters include electro-absorption modulated lasers (EMLs), laser modulators, and electro-optic modulators.

Figure 5A:
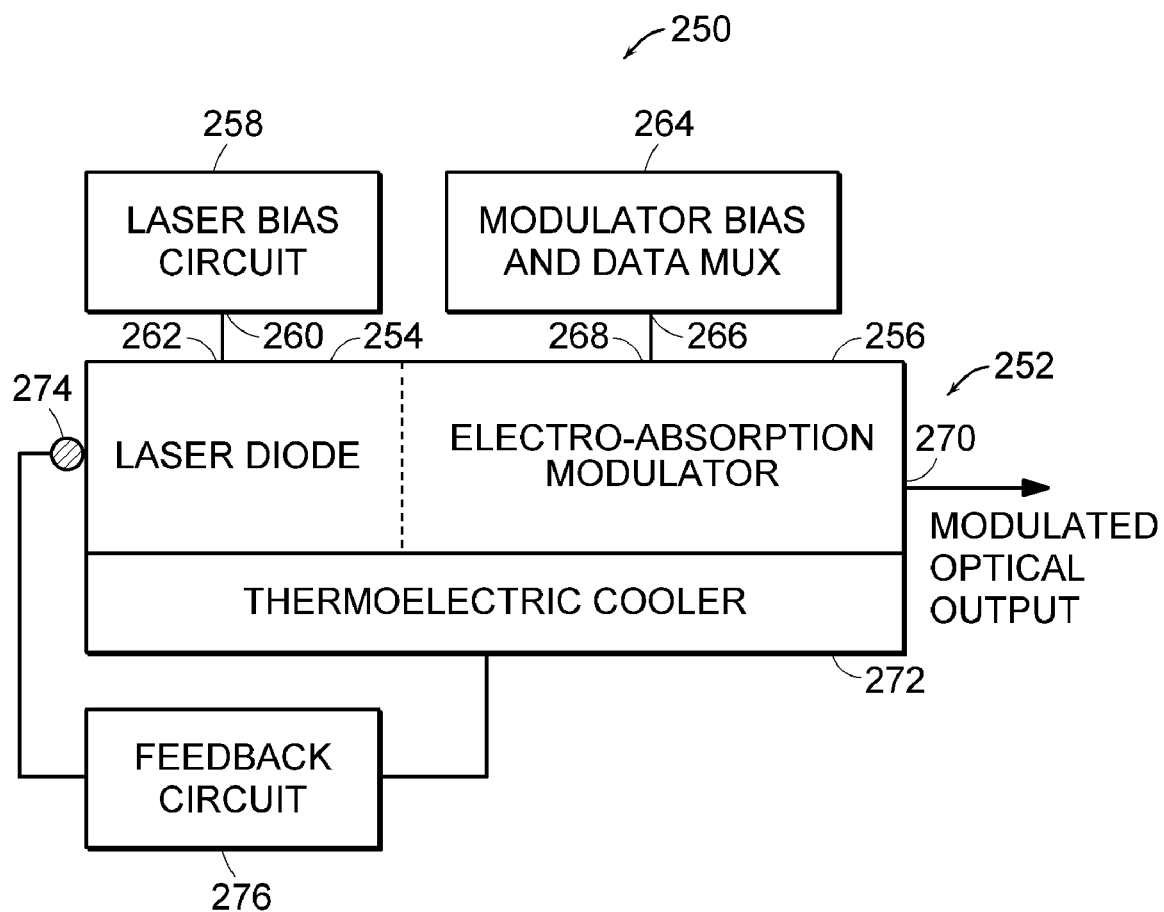
FIG. 5A illustrates a block diagram of an optical transmitter that includes an electro-absorption modulated laser (EML) according to the present invention that uses external cooling and that generates optical signals with improved or optimal spectral and phase characteristics for transmission through an optical fiber link.

FIG. 5A illustrates a block diagram of an optical transmitter 250 that includes an electro-absorption modulated laser (EML) 252 according to the present invention that uses external cooling and that generates optical signals with improved or optimal spectral and phase characteristics for transmission through an optical fiber link. The EML 252 includes a laser diode 254 section and an electro-absorption modulator (EAM) 256 section.

The laser diode 254 section is typically a distributed feed-back (DFB) laser. The EAM 256 is typically a device that includes a semiconductor layer, such as a multi-quantum well semiconductor layer. The semiconductor layer typically has a slightly larger absorption band edge than the photon energy of the light being modulated. The laser diode 254 section is optically coupled to the EAM 256 section. The laser diode 254 section and EAM 256 section are typically integrated onto a single substrate, but can be physically separate devices.

A laser bias circuit 258 has an output 260 that is electrically coupled to a bias input 262 of the laser diode 254. The laser bias circuit 258 generates a continuous wave (CW) current that drives the laser diode 254, thereby causing the laser diode 254 to emit substantially monochromatic light of a predetermined wavelength.

A modulator bias and data multiplexing circuit 264 has an output 266 that is electrically coupled to a modulation input 268 of the EAM 256. The modulator bias and data multiplexing circuit 264 generates a voltage across the multi-quantum well semiconductor layer that produces a reverse bias modulating electric field across the semiconductor layer of the EAM 256. The reverse bias modulating electric field causes the absorption edge of the semiconductor layer of the EAM 256 to reversibly move to a longer wavelength, which corresponds to a lower absorption edge. The lower absorption edge causes the semiconductor layer of the EAM 256 to absorb the light generated by the laser diode 254 section that propagates through the semiconductor layer of the EAM 256.

Reducing the voltage across the multi-quantum well semiconductor layer results in the elimination or reduction of the reverse bias electric field, which causes the semiconductor layer of the EAM 256 to allow light generated by the laser diode 254 to transmit through the semiconductor layer of the EAM 256. Therefore, light emitted from the laser diode 254 that propagates to the EAM 256 is modulated by modulating the voltage across the multi-quantum well semiconductor layer of the EAM 256. The light emitted is modulated between a sufficient reverse bias voltage across the semiconductor layer that causes the layer to be substantially opaque to the light emitted from the laser diode 254, and substantially zero or a sufficiently positive bias voltage that causes the layer to be substantially transparent to the light emitted from the laser diode 254.

The resulting modulated light is emitted at an optical output 270 of the EML 252. The optical output 270 is directly coupled to the single-mode optical fiber 108 (FIGS. 1 and 2). The wavelength of the modulated light can be controlled by adjusting the amplitude of the CW current generated by the laser bias circuit 258 and applied to the laser diode 254. The wavelength of the modulated light can also be controlled by adjusting the temperature of the laser diode 254.

The EML 252 of FIG. 5A uses external cooling. The EML 252 includes a thermoelectric cooler (TEC) 272 that controls the temperature of the laser diode 254 and the EAM 256. The temperature of the EML 252 can be stabilized by using a thermal sensor 274 and a feedback circuit 276. The thermal sensor 274 is thermally coupled to the laser diode 254 and is electrically coupled to the feedback circuit 276. The feedback circuit 276 is electrically coupled to the TEC 272. The feedback circuit 276 receives a signal from the thermal sensor 274 that is related to the temperature of the laser diode 254 and generates a signal in response to the temperature. The signal generated by the feedback circuit 276 controls the thermal properties of the TEC 272 to maintain the laser diode 254 at a predetermined operating temperature (and thus the major portion of spectral energy of the emitted light at the desired wavelength) independent of ambient temperature.

In one embodiment of the invention, the EML 252 is specifically designed and fabricated to have at least one parameter that causes the EML 252 to generate a transmission spectrum with suppressed phase and sideband information. There are numerous physical EML parameters that can be adjusted to change the amplitude and phase characteristics of the modulated optical signal in order to suppress phase and sideband information from the transmission spectrum.

For example, parameters of the EAM 256, such as the extinction ratio, the polarization properties, the 3-dB bandwidth, the modulator chirp, the optical mode structure, the input third-order intercept (IIP3), the spurious free dynamic range (SFDR), and the output facet coating properties can be adjusted during design and fabrication to suppress phase and/or sideband information from the transmission spectrum.

Also, parameters of the laser diode 254, such as the wavelength, the optical mode structure, and the parameters of the output facet coating can be adjusted during design and fabrication to suppress phase and/or sideband information from the transmission spectrum. In addition, parameters specific to EML devices, such as the electrical isolation and the optical coupling between the laser diode 254 and the EAM 256 can be adjusted during design and fabrication to suppress phase and/or sideband information from the transmission spectrum.

In one embodiment of the invention, the operating conditions of the EML 252 are chosen so as to suppress phase and/or sideband information in the transmission spectrum. For example, operating conditions, such as the current generated by the laser bias circuit 258 and the resulting optical power received by the EAM 256, the bias voltage swing that is generated by the bias and data multiplexing circuit 264 and received by the EAM 256, and the operating temperature of the laser diode 254 and the EAM 256 can be adjusted during operation of the EML 252 to suppress phase and/or sideband information in the transmission spectrum.

Including the thermoelectric cooler 272 that controls the temperature of the laser diode 254 and the EAM 256 is generally undesirable because thermoelectric coolers are power-intensive, relatively large and relatively expensive devices. In one embodiment of the present invention, the optical transmitter includes an un-cooled electro-absorption modulated laser (EML) according to the present invention that does not use external cooling.

Figure 5B:
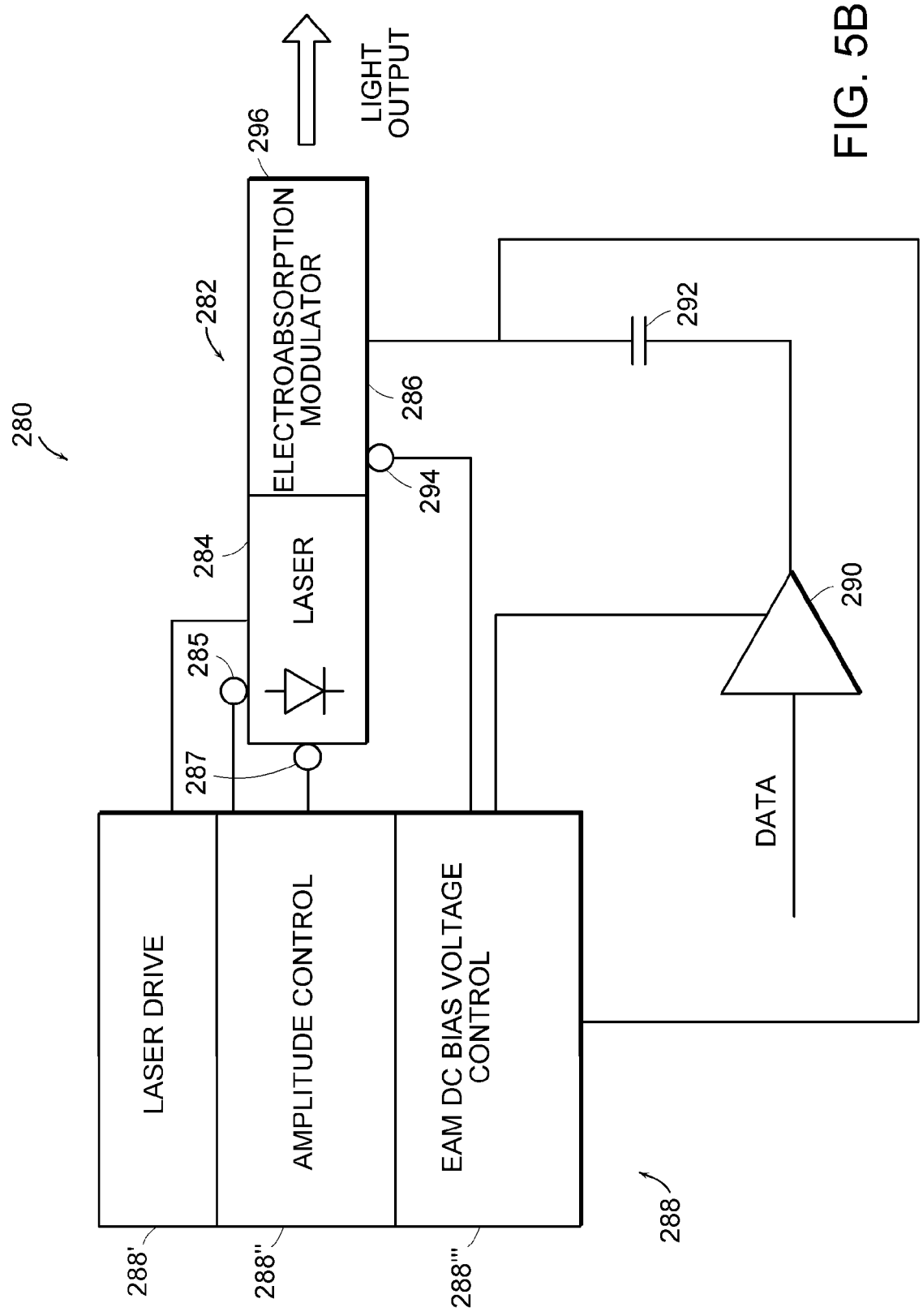
FIG. 5B illustrates a block diagram of an optical transmitter that includes an un-cooled electro-absorption modulated laser (EML) according to the present invention that does not use external cooling and that generates optical signals with improved or optimal spectral and phase characteristics for transmission through an optical fiber link.

FIG. 5B illustrates a block diagram of an optical transmitter 280 that includes an un-cooled electro-absorption modulated laser (EML) 282 according to the present invention that does not use external cooling and that generates optical signals with improved or optimal spectral and phase characteristics for transmission through an optical fiber link. Un-cooled EMLs, which are suitable for use in optical transmitters according to the present invention are described in U.S. patent application Ser. No. 10/005,065, filed on Dec. 4, 2001, which is assigned to the assignee of the present application. The entire disclosure of U.S. patent application Ser. No. 10/005,065 is incorporated herein by reference. These un-cooled EML devices require less power and less space than known EML devices that use external cooling.

The un-cooled EML 282 includes a laser diode 284 and an electro-absorption modulator (EAM) 286. The laser diode 284 and EAM 286 can be integrated onto a single substrate or can be physically separate devices. In one embodiment, the laser diode 284 is a distributed feedback (DFB) laser and the EAM 286 includes a semiconductor layer. The EAM 286 has electrically controllable light absorption and is designed to have a bandgap energy that corresponds to a wavelength that is shorter than the lasing wavelength of the laser diode 284.

In one embodiment, the EAM 286 includes a multi-quantum well layer. In another embodiment, the EAM 286 includes a bulk semiconductor layer. The material composition of the EAM 286 is chosen to achieve a wide operating temperature range. In one embodiment, the EAM 286 includes a semiconductor layer that is designed so that it is substantially transparent to light when a substantially zero (meaning zero or slightly positive voltage, for instance, +0.5 volts) or a reverse bias voltage is applied across the semiconductor layer at operating temperatures of the electro-absorption modulator that are substantially greater than 25 degrees Celsius.

An un-cooled EML according to the present invention is desirable because it can be operated in many applications without external cooling. The un-cooled EML is relatively inexpensive, consumes relatively low power, and requires a relatively small volume compared with known EMLs and discrete EAMs. However, the un-cooled EML according to the present invention could be used with external cooling if desired. In some embodiments, external cooling is used to control the temperature of the laser diode 284 in order to control the wavelength emitted from the laser diode 284.

The optical transmitter 280 includes an electronic control circuit 288 that compensates for the inherent temperature drift in performance of the EML 282 over a wide temperature range. The control circuit 288 changes at least one of the DC bias voltage for the EAM 286, the peak-to-peak voltage amplitude of the modulation signal that is applied to the EAM 286, and the laser bias current for the diode laser 284 as functions of operating temperature to allow the EML 282 to operate over a wide operating temperature range.

The control circuit 288 includes an electronic laser drive circuit 288', or bias control circuit that is electrically coupled to a bias input of the laser diode 284. The electronic laser drive circuit 288' generates a continuous wave (CW) current that drives the laser diode 284 causing it to emit photons. The control circuit 288 also includes an amplitude control circuit 288" that is electrically connected to the laser drive circuit 288'. The amplitude control circuit 288" controls the amplitude of the CW current that is generated by laser drive circuit 288' and applied to the diode laser 284.

In one embodiment, a temperature sensor 285 is positioned in thermal communication with the laser diode 284. The output of the temperature sensor 285 is electrically connected to an input of the amplitude control circuit 288". The temperature sensor 285 generates a signal at the output that is related to the temperature of the laser diode 284. The amplitude control circuit 288" is slaved to the temperature of the laser diode 284. The amplitude control circuit 288" receives the signal generated by the temperature sensor 285 at the input and generates a signal that instructs the electronic laser drive circuit 288' to change the CW current that drives the laser diode 284 in response to the measured temperature so as to control the wavelength of the light emitted by the laser diode 284.

In one embodiment, the optical power emitted from the laser diode 284 is monitored by an optical power detector 287 that is positioned in optical communication with the back facet of the laser diode 284. In other embodiments, an optical power detector (not shown) is in optical communication with the front facet of the laser diode 284. The optical power detector 287 generates an electrical signal that is related to the optical power emitted by the laser diode 284 that propagates into the EAM 286. The amplitude control circuit 288" has an input that is electrically connected to the output of the optical power detector 287. The amplitude control circuit 288" generates a signal that instructs the laser drive circuit 288' to generate a CW current having a predetermined amplitude in response to the optical power emitted from the laser diode 284.

An electronic data modulation circuit 290 is electrically coupled to a modulation input of the EAM 286. In one embodiment, the electronic data modulation circuit 290 is capacitively coupled to the modulation input of the EAM 286 by a capacitor 292. The electronic data modulation circuit 290 generates a modulation signal that reverse biases the EAM 286 and causes the EAM 286 to modulate the light emitted from the laser diode 284 that propagates into the EAM 286 by either transmitting the light through the EAM 286 or by absorbing the light within the EAM 286.

The control circuit 288 also includes an EAM DC bias voltage control circuit 288'" that has an output that is electrically connected to a control input of the data modulation circuit 290. In one embodiment, a temperature sensor 294 is positioned in thermal communication with the EAM 286. The temperature sensor 294 generates a signal at an output that is related to the temperature of the EAM 286. The EAM DC bias voltage control circuit 288'" includes an input that is electrically coupled to the output of the temperature sensor 294. In this embodiment, the EAM DC bias voltage control circuit 288'" is slaved to the temperature of the EAM 286. The EAM DC bias voltage control circuit 288'" receives the signal generated by the temperature sensor 294 at the input and generates a signal that instructs the data modulation circuit 290 to change the DC bias voltage applied to the EAM 286 in response to the measured temperature so as to control the absorption edge of the EAM 286.

The light modulated by the EAM 286 is emitted at an optical output 296 of the EML 280. In one embodiment, the optical output 296 is directly coupled to the single mode optical fiber 108 (FIG. 1). In another embodiment, the optical output 296 is directly coupled to the first spatial mode converter 110. The wavelength of the modulated light is controlled by adjusting the CW current generated by the laser drive circuit 288' and applied to the bias input of the laser diode 284. The wavelength of the modulated light can also be controlled by adjusting the temperature of the laser diode 284.

Figure 6:
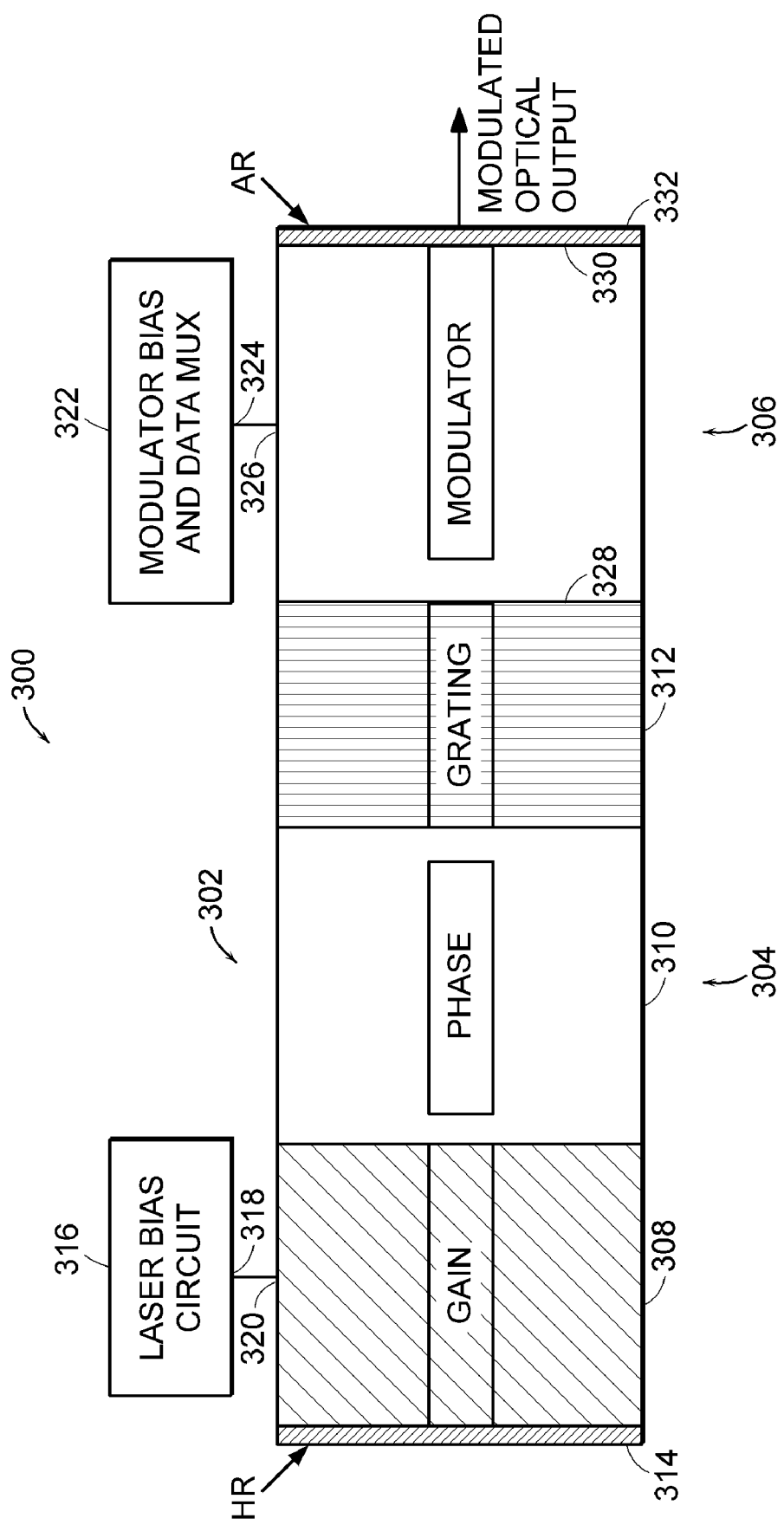
FIG. 6 illustrates a block diagram of an optical transmitter that includes an embodiment of a laser modulator according to the present invention that generates optical signals with improved or optimal spectral and phase characteristics for transmission through an optical fiber link.

The present invention can also be practiced with numerous types of laser modulators. FIG. 6 illustrates a block diagram of an optical transmitter 300 that includes an embodiment of a laser modulator 302 according to the present invention that generates optical signals with improved or optimal spectral and phase characteristics for transmission through an optical fiber link. The optical transmitter 300 includes a laser section 304 and a modulator section 306.

The laser section 304 of the laser modulator 302 shown in FIG. 6 is a tunable three section Distributed Bragg Reflector (DBR) laser. In other embodiments (not shown), a single section DFB laser can be used if wavelength tuning is not desirable. The laser section 304 includes a gain section 308, a phase section 310, and a grating section 312 that are butted together. The gain section 308 generates an optical signal. The phase section 310 introduces an optical phase shift to tune the laser wavelength. The grating section 312 forms a DBR mirror.

A high reflection coating 314 is deposited on one side of the gain section 308. A laser cavity is formed between the high reflection coating 314 and the DBR mirror formed by the grating section 312. The optical transmitter 300 includes a laser bias circuit 316 having an output 318 that is electrically connected to a bias input 320 of the gain section 308. The laser bias circuit 316 generates a current at the output 318 that biases the gain section 308 to emit the desired optical signal. The design and operation of such lasers are well known in the art.

The modulator section 306 of the laser modulator 302 is positioned outside of the laser cavity beyond the DBR mirror in the grating section 312. Forming the modulator section 306 external to the laser cavity introduces relatively low wavelength chirp into the modulated optical signal. An input 328 of the modulator section 306 is optically coupled to the grating section 312. An output facet 330 of the modulator section 306 transmits the modulated optical signal. An anti-reflection coating 332 is deposited on the output facet 330 of the modulator section 306 to prevent undesired reflection from entering the laser cavity.

A modulator bias and data multiplexing circuit 322 has an output 324 that is electrically coupled to a modulation input 326 of the modulator section 306. The modulator section 306 is an intensity modulator that modulates a CW optical signal that is generated by the laser section 304 with the data generated by the modulator bias and data multiplexing circuit 322. The modulated optical signal is transmitted though the output facet 330 of the modulator section 306 and the anti-reflection coating 332.

Many different types of modulator sections 306 can be used with an optical transmitter 300. For example, the modulator section 306 can be a Franz-Keldysh-type electroabsorption modulator section. Such a modulator section 306 includes a section of waveguide with an active region of bulk semiconductor heterostructure material having a slightly larger bandgap energy than the photon energy of the optical signal being modulated. When the modulator bias and data multiplexing circuit 322 applies a reverse bias field to the modulation input 326 of the modulator section 306, the absorption edge is lowered, thus reducing the light emitted.

The modulator section 306 can also be a modulated amplifier-type modulator. Such a modulator includes a gain section that can be formed of the same material as the gain section 308 in the laser cavity. Modulated amplifier-type modulators can achieve relatively broad optical bandwidth. In addition, the modulator section 306 can be a guide/antiguide-type modulator. Guide/antiguide modulators use refractive index effects to achieve intensity modulation. However, unlike other devices that use refractive index effects, such as Mach-Zehnder type modulators, these modulators do not generate large amounts of phase and sideband information in the transmission spectrum because they do not use interference effects.

In one embodiment of the invention, the optical transmitter 300 is specifically designed and fabricated to have at least one parameter that causes the optical transmitter 300 to generate a transmission spectrum with suppressed phase and sideband information. There are numerous physical parameters of the laser section 304 and the modulator section 306 that can be adjusted to change the amplitude and phase characteristics of the modulated optical signal in order to suppress phase and sideband information from the transmission spectrum.

For example, parameters of the laser section 304, such as the wavelength, the optical mode structure, and the parameters of the output facet coating can be adjusted during design and fabrication to suppress phase and/or sideband information from the transmission spectrum. In addition, parameters specific to DBR and DFB laser devices, such as the grating parameters and the properties of the waveguides in the gain section 308, the phase section 310, and the grating section 312, as well as the coupling parameters between these sections, can be adjusted during design and fabrication to suppress phase and/or sideband information from the transmission spectrum.

Also, parameters of the modulator section 306, such as the extinction ratio, the polarization properties, the 3-dB bandwidth, the modulator chirp, the optical mode structure, the input third-order intercept (IIP3), the spurious free dynamic range (SFDR), the lateral index guide and antiguide profiles (for guide/antiguide-type modulators), and the output facet coating properties can be adjusted during design and fabrication to suppress phase and/or sideband information from the transmission spectrum.

In one embodiment of the invention, the operating conditions of the optical transmitter 300 are chosen so as to suppress phase and/or sideband information in the transmission spectrum. For example, the current generated by the laser bias circuit 316 and the resulting optical power received by the modulator section 306, the bias voltage that is generated by the bias and data multiplexing circuit 322 and received by the modulator section 306, and the operating temperature of the laser section 304 and the modulator section 306 can be adjusted during operation to suppress phase and/or sideband information from the transmission spectrum.

The optical transmitters described herein that generate optical signals with improved or optimal spectral and phase characteristics for transmission through an optical fiber link can be used for transmitting 10GEthernet data in multi-mode optical fiber transmission systems greater than 300 meters long. Error free transmission of optical signals having a 1310 nm wavelength over 300 meters of multi-mode optical fiber using such optical transmitters has been demonstrated.

Figure 7:
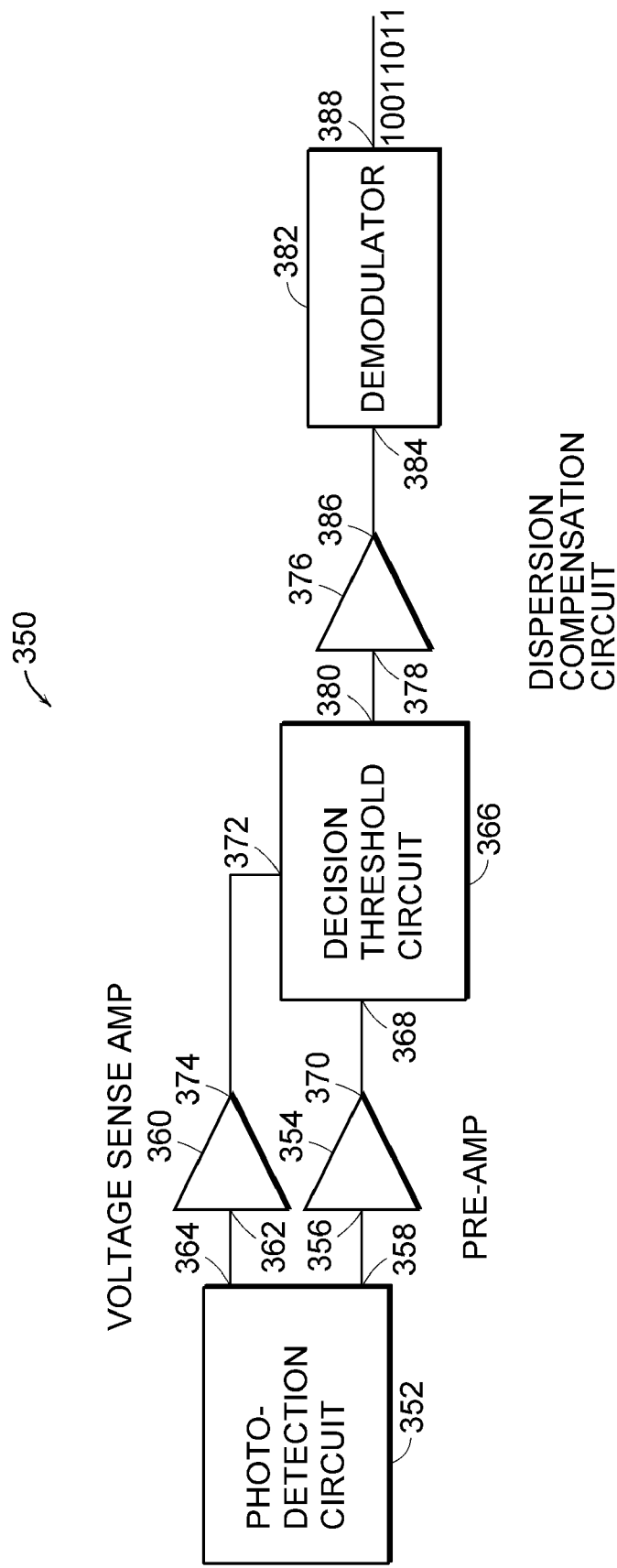
FIG. 7 illustrates a block diagram of one embodiment of an optical receiver for the optical fiber transmission system with increased effective modal bandwidth according to the present invention that includes dynamic reoptimization and electronic dispersion compensation.

FIG. 7 illustrates a block diagram of one embodiment of an optical receiver 350 for the optical fiber transmission system with increased effective modal bandwidth according to the present invention that includes dynamic re-optimization and electronic dispersion compensation. The dynamic re-optimization and electronic dispersion compensation alone or in combination increase the bandwidth-distance product of the optical fiber transmission system according to the present invention.

The optical receiver 350 includes a photo-detection circuit 352 that is optically coupled to the output of the second single-mode optical fiber 122 (FIG. 1). The photo-detection circuit 352 includes a photo-diode that converts the received optical signal into an electrical signal. The optical receiver 350 also includes a pre-amplifier 354 having an input 356 that is electrically connected to a signal output 358 of the photo-detection circuit 352. The pre-amplifier 354 amplifies the electrical signal generated by the photo-detection circuit 352 to a signal level that is suitable for electronic processing.

The optical receiver 350 also includes a voltage sensing amplifier 360 having an input 362 that is electrically connected to a control output 364 of the photo-detection circuit 352. The voltage sensing amplifier 360 generates a feed forward signal having a voltage that is proportional to the average optical power level of the received optical signal. A decision threshold circuit 366 has a signal input 368 that is electrically connected to an output 370 of the pre-amplifier 354 and a control input 372 that is electrically connected to an output 374 of the voltage sensing amplifier 360. The decision threshold circuit 366 adjusts the decision threshold in the optical receiver 350 to the optimal threshold for the received power level in order to maximize the signal-to-noise ratio of the optical receiver 350.

The optical receiver 350 includes an electronic dispersion compensation circuit 376 having an input 378 that is electrically connected to an output 380 of the decision threshold circuit 366. The electronic dispersion compensation circuit 376 compensates for the effects of dispersion by reconstructing the dispersed optical signals. The electronic dispersion compensation circuit 376 can physically reconstruct the dispersed optical signals in numerous ways that are known in the art. Dispersion can severely degrade signals in the optical fiber transmission systems 100, 150 that are described in connection with FIG. 1 and FIG. 2. Several different types of dispersion can occur in these optical fiber transmission systems.

For example, chromatic dispersion can occur in WDM optical fiber transmission systems. Chromatic dispersion is caused by differences in the speed at which signals having different wavelengths travel in the optical fiber link. Chromatic dispersion generally decreases the acceptable transmission distance as the square of the bit rate.

Polarization mode dispersion (PMD) occurs when the orthogonal polarization components of the optical signal travel at different rates in the optical fiber link. Polarization mode dispersion results from asymmetries in the optical fiber core. Polarization mode dispersion causes a statistical disruption in network operation and, consequently, limits the transmission distance.

Signal degradation caused by these dispersions, if uncompensated, can corrupt the received optical signal by broadening the pulses in the optical signal, which causes Inter Symbol Interference (ISI). The ISI will eventually degrade the signal quality enough for the signal to fall below the acceptable threshold for service. Thus, these dispersions can limit the possible bandwidth-distance product in the optical fiber links and can cause service interruptions.

The dispersion compensation circuit 376 includes at least one active filter. There are many different types of active filters know in the art that are suitable for electronic dispersion compensation. For example, the active filter can be a Finite Impulse Response (FIR) filter, such as a Feed Forward Equalizer (FFE) filter. Such filters sample the received signal, after electro-optic conversion by the photo-detection circuit 352. Different delayed samples are scaled and then summed once per sample clock. The length of the FIR filter (i.e. the number of taps) is related to the amount of ISI that is incurred during transmission.

The dispersion compensation circuit 376 can also include a Decision Feedback Equalizer (DFE) filter that is used with the FFE filter to further reduce the ISI in the optical signal. The DFE filter takes the decisions from the FFE filter as its input. The output of the DFE filter is combined with the output of the FFE filter and is fed back to the input of the DFE filter. The clock and data are then recovered from the dispersion compensated signal.

The optical receiver 350 also includes a demodulator 382 having an input 384 that is electrically connected to an output 386 of the dispersion compensation circuit 376. The demodulator 382 demodulates the reconstructed optical signal and recovers the transmitted data. The demodulator 382 generates the recovered data at an output 388.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A multi-mode optical fiber link comprising:
   a) a single-mode optical fiber having an input that receives an optical signal for transmission through the multi-mode optical fiber link;
   b) a first spatial mode converter having an input that is coupled to an output of the single-mode optical fiber, the first spatial mode converter converting the optical signal to a plurality of modes including a fundamental mode with information content and conditioning a modal profile, thereby reducing modal dispersion and increasing an effective bandwidth of the optical signal, of the optical signal for propagation through a multi-mode optical fiber;
   c) a multi-mode optical fiber having an input that is coupled to an output of the first spatial mode converter, the multi-mode optical fiber propagating the optical signal having the plurality of modes; and
   d) a second spatial mode converter having an input that is coupled to an output of the multi-mode optical fiber, the second spatial mode converter reducing a number of optical modes in the optical signal, wherein both the first and the second spatial mode converters increase an effective modal bandwidth of the optical signal propagating through an output of the second spatial mode converter.

2. The optical fiber link of claim 1 wherein the first spatial mode converter comprises a modal conditioning patch that conditions the optical signal propagating from the single-mode optical fiber to a multi-mode optical signal for transmission through the multi-mode optical fiber.

3. The optical fiber link of claim 1 wherein the input of the multi-mode optical fiber is coupled to the output of the first spatial mode converter at an interface, wherein the interface couples a geometric center optical axis of the first spatial mode converter to a geometric center optical axis of the multi-mode optical fiber with a predetermined offset distance.

4. The optical fiber link of claim 3 wherein the predetermined offset distance is between about fifteen and twenty-five micrometers.

5. The optical fiber link of claim 1 wherein the input of the multi-mode optical fiber is coupled to the output of the first spatial mode converter at an interface so that a center of a modal profile of the optical signal is launched from the first spatial mode converter into the multi-mode optical fiber at a position that is displaced a predetermined distance from a geometric center optical axis of the multi-mode optical fiber.

6. The optical fiber link of claim 1 wherein the input of the multi-mode optical fiber is coupled to the output of the first spatial mode converter at an interface so that a center of a modal profile of the optical signal is launched from the first spatial mode converter into the multi-mode optical fiber at a position that is displaced a predetermined distance from a peak optical intensity profile in the multi-mode optical fiber.

7. The optical fiber link of claim 1 wherein the input of the multi-mode optical fiber is coupled to the output of the first spatial mode converter at an interface so as to achieve a predetermined non-zero angle between a geometrical center optical axis of the first spatial mode converter and a geometrical center optical axis of the multi-mode optical fiber.

8. The optical fiber link of claim 1 wherein the input of the multi-mode optical fiber is coupled to the output of the first spatial mode converter at an interface so that the optical signal is launched from the first spatial mode converter into the multi-mode optical fiber at a predetermined non-zero angle relative to a geometrical center optical axis of the multi-mode optical fiber.

9. The optical fiber link of claim 1 wherein the input of the multi-mode optical fiber is coupled to the output of the first spatial mode converter at an interface so that the optical signal is launched from the first spatial mode converter into the multi-mode optical fiber at a predetermined non-zero angle relative to a peak optical intensity profile in the multi-mode optical fiber.

10. The optical fiber link of claim 1 further comprising an optical detector that is butt-coupled directly to the output of the second spatial mode converter.

11. The optical fiber link of claim 1 further comprising a second single-mode optical fiber that is coupled to the output of the second spatial mode converter.

12. The optical fiber link of claim 1 further comprising a single-mode optical fiber that couples two segments of the multi-mode optical fiber.

13. The optical fiber link of claim 1 wherein at least one of the first and the second spatial mode converters comprises a slit aperture.

14. The optical fiber link of claim 1 wherein at least one of the first and the second spatial mode converters comprises a pin hole aperture.

15. The optical fiber link of claim 14 wherein the pin hole aperture comprises at least two concentric circular apertures.

16. The optical fiber link of claim 14 wherein the pin hole aperture has a diameter that is between about twelve and twenty-five micrometers.

17. The optical fiber link of claim 1 wherein the second spatial mode converter reduces a number of higher-order modes propagating through the output of the multi-mode optical fiber link.

18. The optical fiber link of claim 1 wherein the second spatial mode converter reduces a number of lower-order modes propagating through the output of the multi-mode optical fiber link.

19. The optical fiber link of claim 1 wherein at least one of the first and the second spatial mode converters comprises an optical filter.

20. A method of increasing an effective modal bandwidth of an optical signal transmitting through a multi-mode optical fiber, the method comprising:
   a) spatial mode converting an optical signal to a plurality of modes including a fundamental mode with information content, thereby reducing modal dispersion, and increasing an effective bandwidth of the optical signal;
   b) launching the spatially mode converted optical signal having the plurality of modes into a multi-mode optical fiber at an angle and a displacement relative to a geometrical center optical axis of the multi-mode optical fiber, the angle and the displacement being chosen to excite higher-order modes in the spatially mode converted optical signal propagating in the multi-mode optical fiber;
   c) propagating the spatially mode converted optical signal having the plurality of modes through the multi-mode optical fiber; and
   d) spatial mode converting the spatially mode converted optical signal propagated through the multi-mode optical fiber, thereby further reducing modal dispersion and further increasing the effective bandwidth of the optical signal.

21. The method of claim 20 wherein at least one of the angle and the displacement is equal to zero.

22. The method of claim 20 wherein the spatial mode converting the spatially mode converted optical signal comprises aperturing the spatially mode converted optical signal to reduce the number of modes propagating in the optical signal.

23. The method of claim 20 wherein the spatial mode converting the spatially mode converted optical signal comprises spatially blocking the spatially mode converted optical signal to reduce the number of modes propagating in the optical signal.

24. The method of claim 20 wherein the spatial mode converting at least one of the optical signal and the spatially mode converted optical signal reduces changes in the effective modal bandwidth of the optical signal that are caused by thermal variations in the multi-mode optical fiber.

25. The method of claim 20 wherein the spatial mode converting at least one of the optical signal and the spatially mode converted optical signal reduces changes in the effective modal bandwidth of the optical signal that are caused by polarization effects in the multi-mode optical fiber.

26. The method of claim 20 wherein the spatial mode converting at least one of the optical signal and the spatially mode converted optical signal reduces changes in the effective modal bandwidth of the optical signal that are caused by mechanical stress in the multi-mode optical fiber.

27. The method of claim 20 wherein the spatial mode converting at least one of the optical signal and the spatially mode converted optical signal reduces changes in the effective modal bandwidth of the optical signal that are caused by optical fiber splices in the multi-mode optical fiber.

28. A multi-mode optical communication system comprising:
   a) an optical transmitter that generates an optical signal at an output;
   b) a first spatial mode converter having an input that is coupled to an output of the optical transmitter, the first spatial mode converter converting the optical signal to a plurality of modes including a fundamental mode with information content thereby reducing modal dispersion and increasing an effective bandwidth of the optical signal, and conditioning a modal profile of the optical signal for propagation through a multi-mode optical fiber;
   c) a multi-mode optical fiber having an input that is coupled to an output of the first spatial mode converter at an interface, the interface exciting higher-order modes in the optical signal propagating in the multi-mode optical fiber;
   d) a second spatial mode converter having an input that is coupled to an output of the multi-mode optical fiber, the second spatial mode converter reducing a number of optical modes in the optical signal, wherein both the first and the second spatial mode converters increase an effective modal bandwidth of the optical signal propagating through an output of the second spatial mode converter; and
   e) an optical receiver having an input that is coupled to the output of the second spatial mode converter, the optical receiver receiving the optical signal.

29. The communication system of claim 28 wherein the transmitter generates the optical signal with relatively low time-varying phase and sideband information.

30. The communication system of claim 28 wherein the optical transmitter comprises an electro-absorption modulated laser.

31. The communication system of claim 30 wherein the electro-absorption modulated laser comprises a semiconductor active layer that is chosen for operation without external cooling.

32. The communication system of claim 30 wherein the electro-absorption modulated laser comprises a semiconductor active layer that is chosen so that it is substantially transparent to light propagating though the semiconductor layer when a substantially zero or a reverse bias voltage is applied across the semiconductor layer at operating temperatures of the electro-absorption modulator that are substantially greater than 25 degrees Celsius.

33. The communication system of claim 28 wherein the first spatial mode converter comprises a modal conditioning patch that conditions the optical signal propagating from the single-mode optical fiber to a multi-mode optical signal for transmission through the multi-mode optical fiber.

34. The communication system of claim 28 wherein the interface couples a geometric center optical axis of the first spatial mode converter to a geometric center optical axis of the multi-mode optical fiber with a predetermined offset distance.

35. The communication system of claim 28 wherein the interface couples a geometric center optical axis of the first spatial mode converter to a geometric center optical axis of the multi-mode optical fiber at a predetermined angle.

36. The communication system of claim 28 wherein at least one of the first and the second spatial mode converters comprises a slit aperture.

37. The communication system of claim 28 wherein at least one of the first and the second spatial mode converters comprises a pin hole aperture.

38. The communication system of claim 37 wherein the pin hole aperture comprises concentric circular apertures.

39. The communication system of claim 28 wherein the optical receiver comprises an optical detector that is butt-coupled directly to the output of the second spatial mode converter.

40. The communication system of claim 28 wherein the optical receiver comprises an active filter that reconstructs dispersed optical signals received by the optical receiver.

41. The communication system of claim 28 wherein the optical receiver automatically adjusts at least one receiver parameter in order to compensate for changes in an average power of the received optical signal.

42. The communication system of claim 28 wherein the optical receiver automatically adjusts the at least one receiver parameter so as to maintain a substantially constant bit error rate as the average power of the received optical signal changes.

43. The communication system of claim 42 wherein the at least one receiver parameter comprises receiver sensitivity.

44. A multi-mode optical communication system comprising:
   a) a means for spatial mode converting an optical signal to a plurality of modes including a fundamental mode with information content, thereby reducing modal dispersion and increasing an effective bandwidth of the optical signal;
   b) a means for launching the spatially mode converted optical signal having the plurality of modes into a multi-mode optical fiber at an angle and a displacement relative to a geometrical center optical axis of the multi-mode optical fiber, the angle and the displacement being chosen to excite higher-order modes in the spatially mode converted optical signal propagating in the multi-mode optical fiber;

c) a means for propagating the spatially mode converted optical signal having the plurality of modes through the multi-mode optical fiber; and d) a means for spatial mode converting the spatially mode converted optical signal propagated through the multi-mode optical fiber, thereby further reducing modal dispersion and further increasing the effective bandwidth of the optical signal.

* * * * *

UNITED STATES PATENT AND TRADEMARK OFFICE
CERTIFICATE OF CORRECTION

PATENT NO. : 7,283,701 B2
APPLICATION NO. : 10/707729
DATED : October 16, 2007
INVENTOR(S) : Hallemeier et al.

It is certified that error appears in the above-identified patent and that said Letters Patent is hereby corrected as shown below:

Col. 19, line 12 should read as follows:
Replace "... including a fundamental mode with information content and conditioning a modal profile, thereby reducing modal dispersion and increasing an effective bandwidth of the optical signal," with -- including a fundamental mode with information content, thereby reducing modal dispersion and increasing an effective bandwidth of the optical signal, and conditioning a modal profile --

Signed and Sealed this

Eleventh Day of December, 2007

JON W. DUDAS
*Director of the United States Patent and Trademark Office*